United States Patent
Alavi

(10) Patent No.: US 7,050,521 B1
(45) Date of Patent: May 23, 2006

(54) FREQUENCY ASSISTED DIGITAL TIMING RECOVERY

(75) Inventor: Reza Alavi, Franklin Park, NJ (US)

(73) Assignee: Analog Devices, Inc., Norwood, MA (US)

( * ) Notice: Subject to any disclaimer, the term of this patent is extended or adjusted under 35 U.S.C. 154(b) by 680 days.

(21) Appl. No.: 10/144,420

(22) Filed: May 13, 2002

(51) Int. Cl.
*H04L 7/04* (2006.01)
*H04L 7/00* (2006.01)

(52) U.S. Cl. .................. 375/362; 375/371

(58) Field of Classification Search ........... 375/354, 375/355, 362–366, 368, 371; 370/503, 522, 370/526, 527; 708/313
See application file for complete search history.

(56) References Cited

U.S. PATENT DOCUMENTS

| | | | |
|---|---|---|---|
| 5,113,116 A * | 5/1992 | Wilson .................. | 310/316.01 |
| 5,627,863 A * | 5/1997 | Aslanis et al. .............. | 375/357 |
| 5,691,974 A * | 11/1997 | Zehavi et al. ............... | 370/203 |
| 5,901,180 A * | 5/1999 | Aslanis et al. .............. | 375/261 |
| 6,389,062 B1 * | 5/2002 | Wu ............................. | 375/222 |
| 6,674,707 B1 * | 1/2004 | Ogura et al. ............. | 369/59.22 |
| 6,765,931 B1 * | 7/2004 | Rabenko et al. ........... | 370/493 |

* cited by examiner

*Primary Examiner*—Tesfaldet Bocure
*Assistant Examiner*—Vineeta Panwalkar
(74) *Attorney, Agent, or Firm*—Gauthier & Connors LLP

(57) ABSTRACT

A method and system is provided for acquisition of the initial timing for a digital phase lock loop timing recovery system. A modified loop filter and post filter allows for an instantaneously change the oscillation frequency of a controllable oscillator and an instantaneous relative change of the sampling phase of the sampled data. These two features are used for initial timing recovery, in which the process of frequency and phase acquisition is separated into two independent steps. Once the initial timing is acquired, the timing recovery system is operated as a conventional digital phase lock loop timing recovery system to track additional frequency and phase drifts at the receiver with respect to the transmitter.

10 Claims, 6 Drawing Sheets

FREQUENCY ASSISTED DIGITAL TIMING RECOVERY

BACKGROUND OF THE INVENTION

The invention relates to the field of receivers, and in particular to receivers having timing recovery subsystems.

Enabling a synchronous transmission between a transmitter and a receiver typically requires a transmitter and receiver to be in phase and frequency lock with respect to a reference clock signal. One such system in which phase and frequency lock is needed for synchronous transmission is an Asymmetrical Digital Subscriber Line (ADSL) system.

ADSL systems are one of a family of related standards and technologies providing for so-called broadband data communications to subscribers over the existing twisted-pair copper wires used in the telephone network's local loops. ADSL systems take advantage of the fact that the twisted-pair wires can transmit data at frequencies higher than the 4 Khz imposed on the voice channel by the telephone network's voice digitizing equipment. Generally, data is transmitted downstream (i.e. towards the subscriber) using a larger portion of the high frequency band than data transmitted upstream.

One type of ADSL implementation uses a transmission scheme known as discrete multitone (DMT), conceptually illustrated in FIG. 1a. Rather than using a single channel for upstream and downstream transmissions, DMT divides the frequency spectrum above the voice band 100 into a number of 4.3125 kHz wide channels 102. Channels 102 are also known as bins. In a typical ADSL system, each bin corresponds to a carrier signal whose frequency is a multiple of 4.3125 kHz and there are approximately 256 bins.

The data to be transmitted in each channel is encoded using IFFT/FFT techniques and is equivalent to quadrature amplitude modulation techniques as conceptually illustrated in FIG. 1b. Refer to ADSL standard. Generally, a DMT symbol is transmitted during consecutive periods of time T. The DMT symbol is the sum of carrier signals in all bins whose phases and amplitudes are derived from the data being modulated in each bin. Thus, the amplitude and relative phase shift combination in each period is representative of the bits to be transmitted during that period. While amplitude modulation has not been illustrated for clarity of the phase shift illustration, FIG. 1b shows the phase of a carrier signal being changed in relation to the modulating data. For instance, a data symbol modifies the phase of a carrier signal during period 112 from the previous signaling interval by one-half the wave period 110. Similarly, the phase of the carrier signal during period 114 is shifted by one-quarter the wave period with respect to the carrier signal during period 112.

To recover the encoded data, the received signal must be sampled over the transmission period T and the phase shift and amplitude of the carrier signals have to be accurately determined for each period. A typical ADSL receiver for recovery of the encoded data is illustrated in FIG. 2a. A received signal r(t) is first pre-filtered using a pre-filter 202. Pre-filter 202 corresponds, for example, to a 4$^{th}$ order butter-worth filter with a 2.5 MHz cutoff frequency. After being filtered, the signal is sampled using an analog-to-digital converter ("A/D") 204. A/D 204 operates at a sampling rate of, for example, 8.832 MHz. A post filter 206 then processes the digitized signal. As shown in FIG. 2b, post filter 206, during the timing recovery phase of the system operation, includes a decimator 208, a data buffer 210 and a Fast Fourier Transform (FFT) signal processor 211. Decimator 208 filters and decimates the digitized signal. The outputs of decimator 208 are then buffered in buffer 210 to create a data frame whose duration is equal to the symbol period T. For example, when the symbol rate is 4.3125×10$^3$ symbols per second, the buffered data frame's duration is 1/4.3125×10$^3$ seconds. For the examples given, a decimation factor of four provides enough samples to satisfy the Nyquist criterion for the frequency of the highest carrier, and results in 512 samples in a buffered data frame.

FFT processor 212 takes the FFT of the data frame and enables recovery of the transmitted data. The FFT of the buffered data per bin corresponds to a constellation point with amplitude A and phase φ. Detector 214 detects this constellation point, determines the data associated with the constellation point and outputs this data as $a_d$.

Since the transmitted data is encoded in the amplitude and phase of the received signal, it is important that the normalized sampled phase, φ, closely approach the transmitted phase of the signal Φ in order for the detector to function properly. To achieve this, the receiver and transmitter need to be in phase and frequency lock with respect to a reference clock signal. In the transmitter, the reference clock signal is used to generate the signals transmitted to the receiver, while the reference clock is used in the receiver to drive the A/D clocking signal. In an ADSL system, the reference clock signal is generated at the Central Office site. The receiver clock is synchronized in phase and frequency to the clock at the Central Office by performing timing recovery on the received signal. Therefore, the receiver must recover timing information from the received signal at appropriate sampling instances $t_k$. Generation of the pilot tone derived from the reference clock at the at the Central Office, and transmission of the pilot tone to the receiver, enables the receiver to achieve phase lock with the transmitted pilot, and to lock the oscillating frequency of its local oscillator to that of the transmitter.

For an ADSL receiver, this timing recovery has generally been performed via a conventional Digital Phase Lock Loop (DPLL) timing recovery subsystem. Timing recovery subsystem comprises a timing-error detector ("TED") 216 followed by a loop filter 218, an oscillator whose frequency is proportional to its input control voltage, i.e. a variable controlled oscillator (VCO) 220, and a zero crossing detector 222.

The pilot tone is transmitted with a given amplitude A, a given phase $\Phi_p$ and with a frequency of n*4.3125×10$^3$, where n represents the bin number allocated to the pilot tone. The transmitted phase corresponds to a known phase (e.g., for ADSL it is 45°), which is used by TED 216. Receiver 200 operates as described above to produce an FFT of a received DMT symbol of duration T. The output of the FFT for the pilot signal for each symbol period corresponds to an amplitude A, and phase, $\phi_p$. A constant value of $\phi_p$ over multiple DMT symbol time periods, and a value of $\phi_p$ equaling $\Phi_p$ occurs when the clock to generate the pilot tone at the transmitter and the clock for the receiver A/D are in phase and frequency lock.

The phase, $\phi_p$ is also input to TED 216, while TED 216 knows $\Phi_p$ a priori. For initial timing recovery, TED 216 then produces an indication $x_k$ of the sampling phase error $\Delta = \phi_p - \Phi_p$. That is, TED outputs an error signal proportional to the difference between $\phi_p$ and $\Phi_p$:

$$x_k = k_d(\phi_p - \Phi_p)$$

where $k_d$ represents the timing error detector gain. This output, upon being filtered by loop filter 218, is used as the input to VCO 220 to control the VCO's frequency output. The output signal of VCO 220 is then applied to zero crossing detector 222 to generate pulses, which are used to generate a clock for A/D 204.

A digital proportional-plus-integral loop filter 300, as shown in FIG. 3, with weighting factors $K_p$ and $K_f$, is normally used in conventional DPLL timing recovery subsystems. This architecture simultaneously corrects initial frequency and phase offsets present between a received and a locally generated signal. Initial frequency and phase offsets are simultaneously corrected by the output of the loop filter adjusting the VCO frequency in small increments until the receiver and transmitter are in phase and frequency lock.

During initial timing acquisition, the loop filter's bandwidth is increased in order to accelerate signal acquisition, at a cost of allowing a decrease in the signal-to-noise ratio. Upon acquisition, the values of $K_f$ and $K_p$ are decreased to decrease the loop bandwidth, thus reducing the noise-based perturbations.

While the loop bandwidth is varied in a typical ADSL to increase the acquisition time, the loop bandwidth is still generally kept small to combat noise. This results in a long overall response time for the initial locking of phase and frequency, while shorter response times are generally desirable.

SUMMARY OF THE INVENTION

On aspect of the present invention provides a receiver in which frequency and a phase offset between a variable controlled oscillator at the receiver and an oscillator at a transmitter are eliminated using a received analog pilot tone. The pilot tone has a known phase and transmitted by the transmitter. The receiver comprises an analog-to-digital converter, a post filter, and a loop filter. A clock for the analog-to-digital converter is produced from an output of the variable controlled oscillator. The analog-to-digital converter receives the analog pilot signal and converts the pilot signal to a digital signal. The post filter receives the digital signal and applies a Fourier transform to successive data frames of the digital signal to produce successive phase outputs. The post filter is also capable of shifting the digital signal in time before applying the Fourier transform so as to produce a shift in the phase outputs. The loop filter produces an output that controls the frequency of the variable controlled oscillator output and has a preload register such that the loop filter output depends on a value loaded into the preload register. To eliminate the frequency offset, the frequency offset is determined from the successive phase outputs. Based on the measured frequency offset, a control voltage value is loaded into the preload register such that the loop filter produces an output that changes the frequency of the variable controlled oscillator output to a value that substantially eliminates the frequency offset. After the frequency offset is substantially eliminated, the phase offset is determined from a phase output and the known phase. The post filter then shifts the digital signal in time so as to shift subsequent phase outputs such that the phase offset is substantially eliminated.

Another aspect of the present invention provides a method of eliminating frequency and phase offset between a variable controlled oscillator at a receiver and an oscillator at a transmitter using a received analog pilot tone. The pilot tone has a known phase and is transmitted by the transmitter. The analog pilot tone is first converted to a digital signal. The input of a loop filter that controls the frequency of an output of the variable controlled oscillator is held constant. The frequency offset is next determined from successive phase outputs that are produced by applying a Fourier transform to successive data frames of the digital signal. A value then is loaded into a preload register of the loop filter such that the loop filter produces an output that changes the frequency of the variable controlled oscillator to a value that substantially eliminates the frequency offset. After the frequency offset is substantially eliminated, the phase offset is determined from the known phase and a phase output produced by applying a Fourier transform to a data frame of the digital signal. The digital signal is then shifted in time so as to shift subsequent phase outputs such that the phase offset is substantially eliminated.

DETAILED DESCRIPTION OF THE INVENTION

As previously described, a conventional DPLL achieves both frequency and phase lock by changing the VCO frequency in small increments until the receiver and transmitter are in lock. This simultaneous acquisition of both phase and frequency can lead to relatively long initial timing acquisition.

The present invention separates the process of frequency and phase acquisitions into two independent steps during the initial acquisition time. This reduces the overall time needed to perform the initial timing recovery. Once the timing is acquired, the loop is operated as a traditional phase lock loop in order to track additional frequency and phase drifts at the receiver with respect to the transmitter.

Accordingly, a receiver having timing recovery according to the present invention is similar to that described above, however, loop filter 218 and post filter 206 are modified to allow for the processing of frequency and phase acquisition in two independent steps during the initial acquisition time.

Figure 1A:
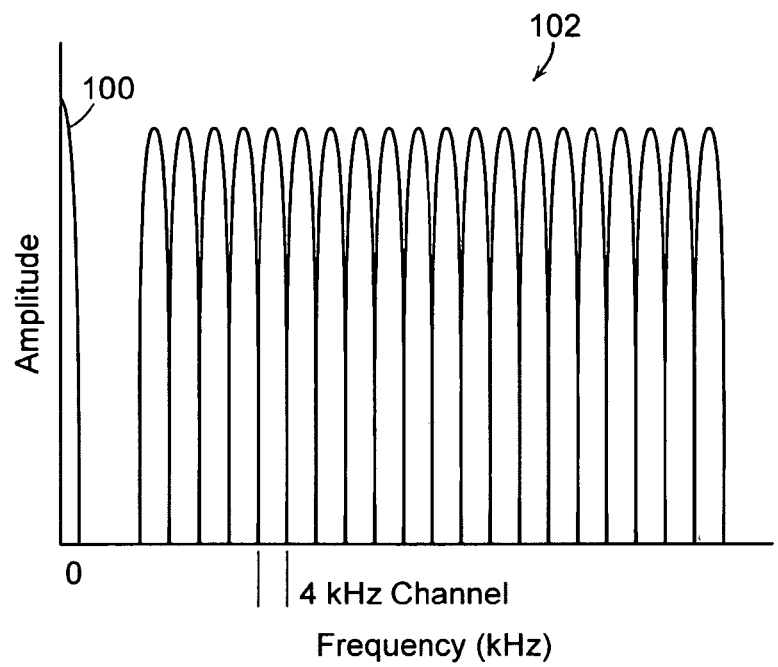
FIG. 1*a* conceptually illustrates a discrete multitone transmission scheme.
Figure 1B:
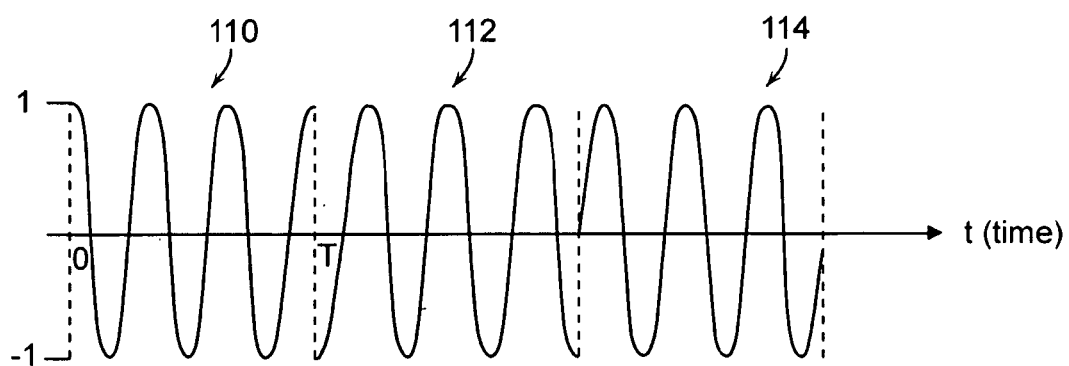
FIG. 1*b* illustrates quadrature amplitude modulation.
Figure 2A:
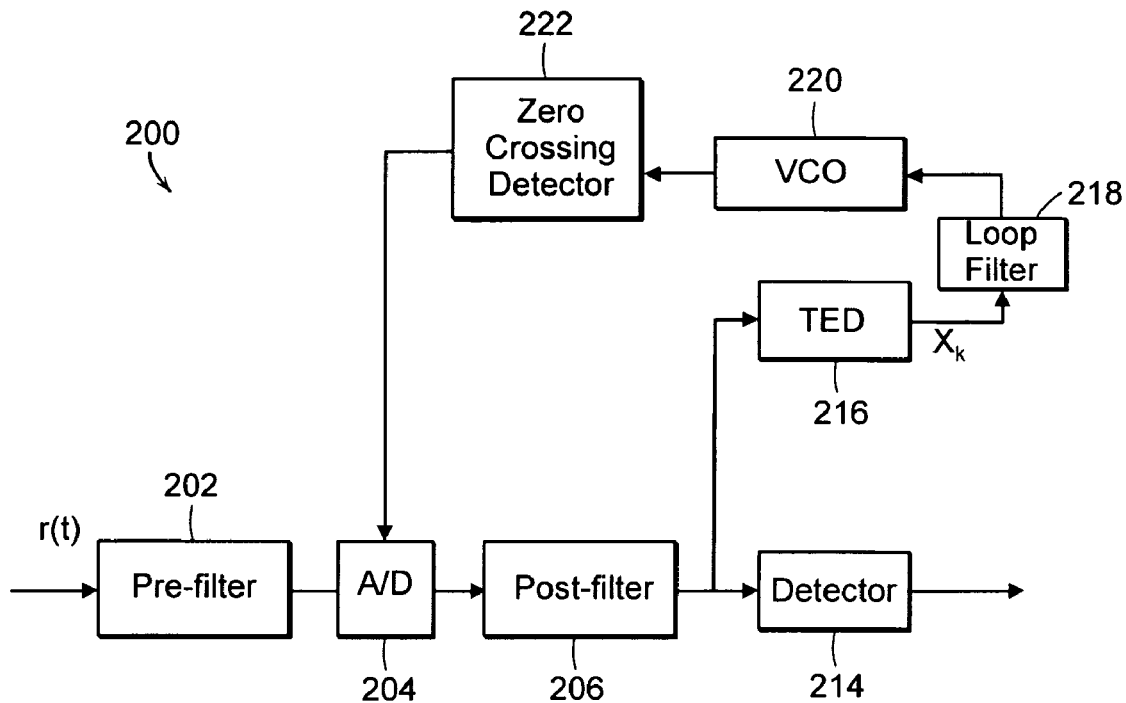
FIG. 2*a* illustrates a typical ADSL receiver for recovery of encoded data.
Figure 2B:
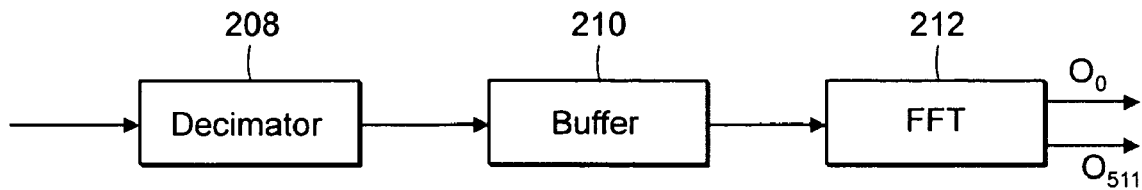
FIG. 2*b* illustrates a conventional post-filter for the receiver illustrated in FIG. 2*a*.
Figure 3:
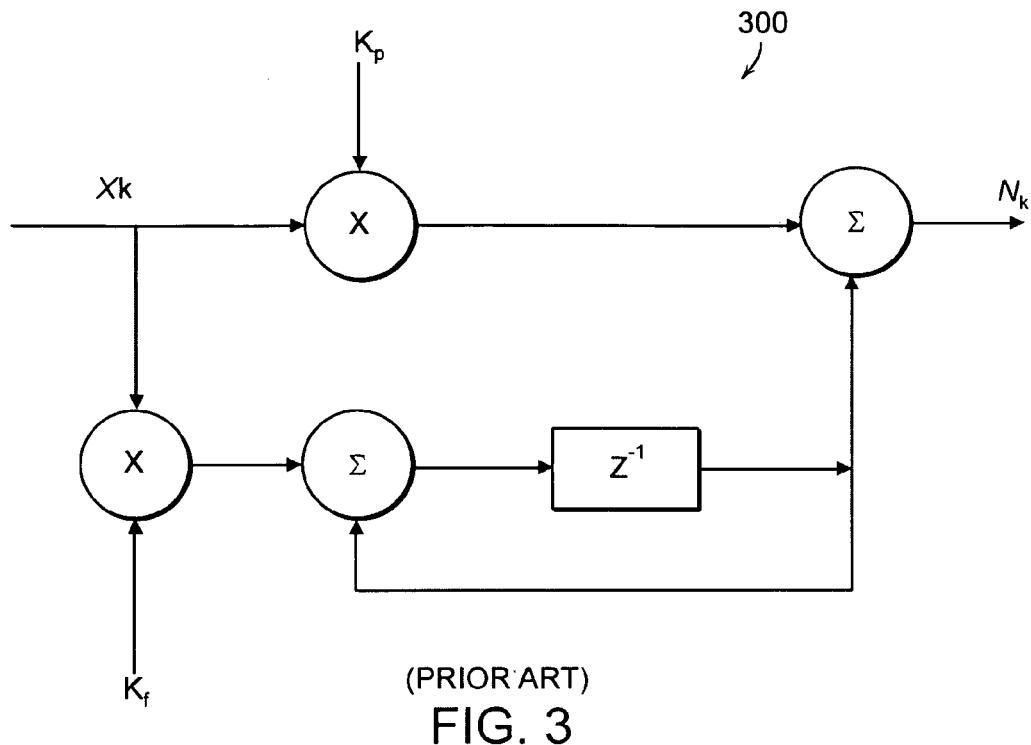
FIG. 3 illustrates a conventional loop filter for the receiver illustrated in FIG. 2*a*.
Figure 4:
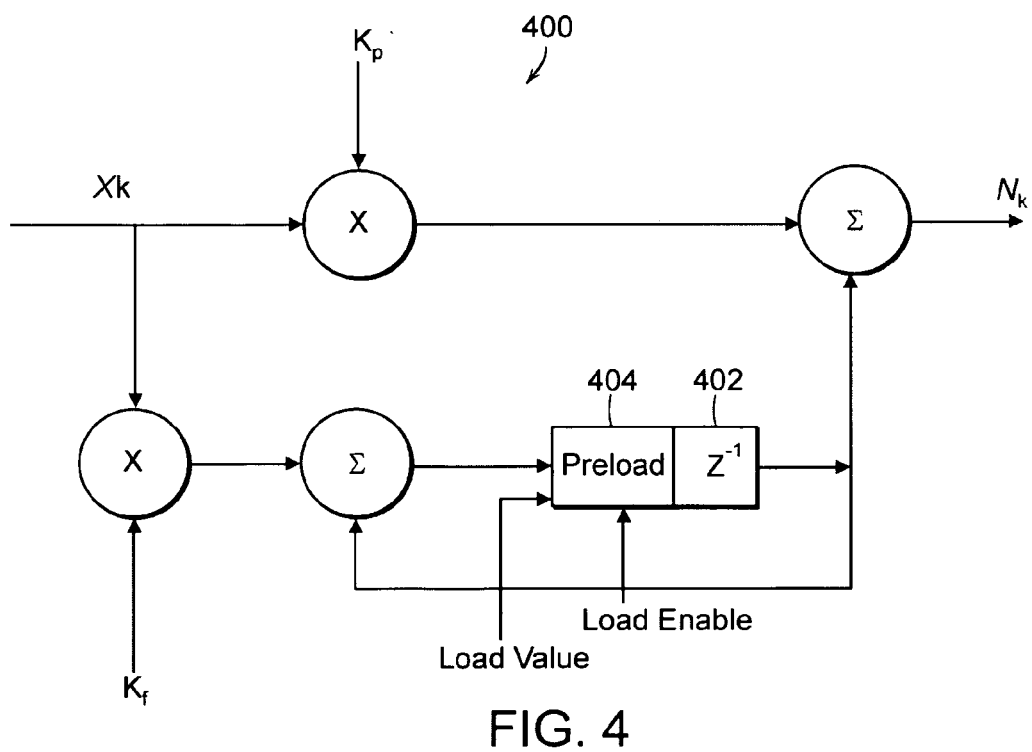
FIG. 4 illustrates a loop filter according to the present invention.

As conceptually illustrated in FIG. 4, loop filter 400 according to the present invention is a modified proportional plus integral filter. Loop filter 400 is modified to include the capability of preloading a determined value into a preload register 404 prior to delay 402, so as to allow an instantaneous change in the value of the integrator. This feature enables a fast adjustment of the controllable oscillation frequency during the acquisition operation mode. During the acquisition mode, $x_k$ is held constant, preferably at 0. Holding the input at 0 results in the output, $N_k$, of loop filter 400 being equal to the value loaded into preload register 404 after a delay. That is, when a value of A is loaded into preload register 404, and $x_k$ is held at 0, then $N_k = A z^{-1}$. As will be appreciated by one of skill in the art, this means that $N_k$ is equal to A after a single delay. This allows for an instantaneous change of the oscillating frequency of VCO 220 because the oscillating frequency depends on the output of loop filter 400. Thus, frequency correction is accomplished by loading preload register 404 with the control voltage value needed at the output of loop filter 400 to cause VCO 220 to output the correct frequency. For instance, if a VCXO is used, the value of A corresponds to the voltage needed according to the VCXO's voltage to frequency curve to produce the correct frequency output.

Figure 5:
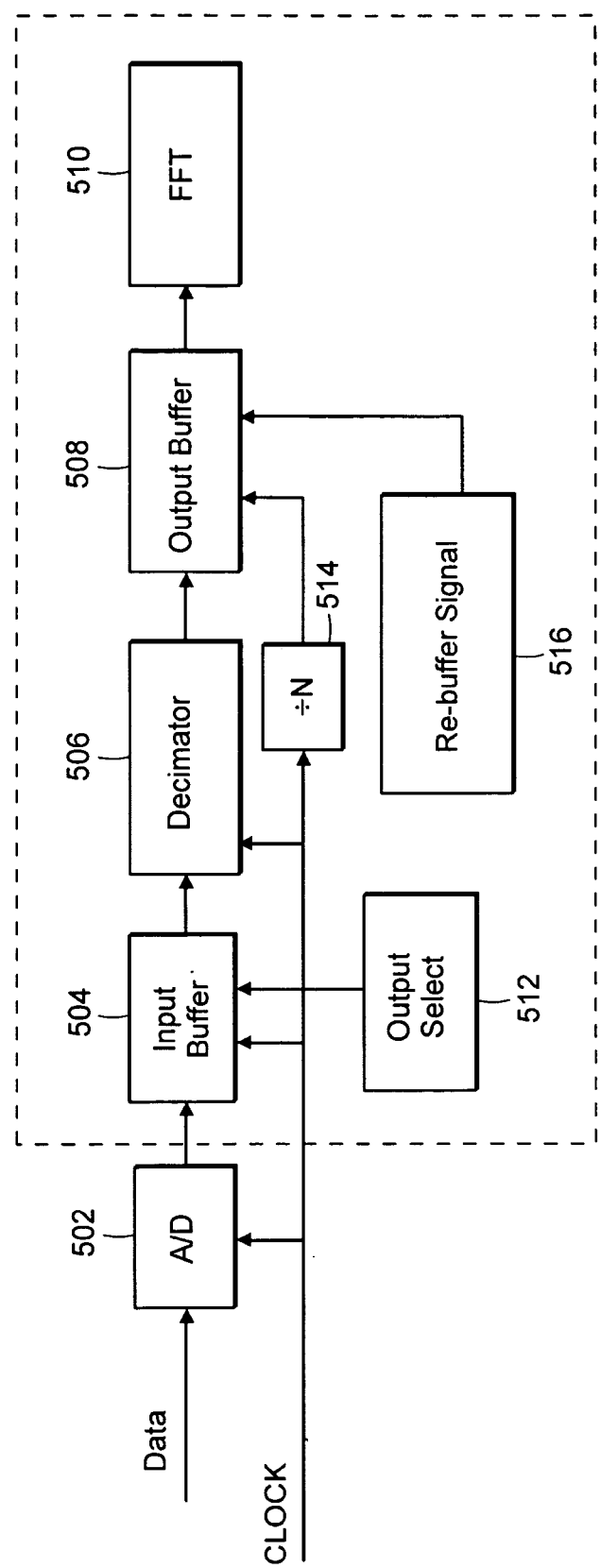
FIG. 5 illustrates a post-filter including masking circuitry according to the present invention.

FIG. 5 conceptually illustrates a post filter 500 according to the present invention that allows for an instantaneous phase correction by shifting the samples of the received signal in the time domain by N samples. As is known in the art, a shift of N samples in the time domain adds a linear term of $\Psi$ radians to the phase output of the FFT. This shift is preferably accomplished by changing the timing at which data is decimated and is buffered.

As previously described, zero crossing detector 222 generates pulses, which are used to form a clock for A/D 502. For example, a 35.328 MHz pulse is generated, which is divided by 4 to produce a resulting 8.832 MHz signal used to clock A/D 502. For an ADSL system with a top carrier signal with a frequency of 1.104 MHz (e.g., an ADSL system with 256 bins, where the carrier frequency in each bin is a multiple of 4.3125 kHz), this provides an oversampling ratio of 4. That is, for such an ADSL system, the well known Nyquist sampling frequency is 2.208 MHz, with a sampling rate of 8.832 MHz being 4 times this. The clock is also used to clock an input buffer 504, a decimator 506 and, after a clock divider 514 divides it by the oversampling ratio, an output buffer 508.

The input buffer has a length at least equal to the oversampling ratio, e.g. four. Thus, for example, at least four samples are buffered in input buffer 504. Output select 512 selects which sample to start the output to decimator 506. By switching which sample is the first sample fed to decimator 506, a shift in time can be imposed on the samples. For example, if samples 1, 2, 3, and 4 are held in input buffer 504, then starting the output to decimator 506 at sample 1 would impose a zero shift on the samples. However, by starting the output at sample 2, a shift of one sample is imposed. As described, this shift creates a corresponding phase adjustment in the output of FFT processor 510. As will be appreciated by one of skill in the art, the amount of phase shift imposed for the exemplary system described when the output tap location for input buffer 504 is changed by M samples (i.e., for a shift of M samples) is $\Delta\phi=\pm 2\pi fc\, N/Fs$, where N is the number of sample shifts, and fc is the frequency of the pilot tone, and fs is the sampling frequency of the pilot tone. In terms of bin locations, frequency of the pilot tone is 4.3125e3 times the bin location of the pilot for an ADSL system with 4.3125 kHz bins.

Thus, the normalized phase change for the input buffer of length for operating at 8.832 MHz is given by $\Delta\phi=\text{bin}*M/(512*4)$, where "bin" refers to the bin location of the pilot tone.

Decimator 506 decimates the oversampled samples by a factor such that Nyquist rate samples are output. For the exemplary system described, therefore, decimator 506 has a decimation factor of 4. Output buffer 508 accumulates Nyquist rate samples to create a data frame that is transformed by FFT processor 510 to result in a constellation point. The data frame's duration is normally equal to the symbol period; however, a re-buffer signal 516 re-aligns the buffering of the data frame to result in a phase adjustment of the output of FFT processor 510 when needed. For example, re-buffer signal 516 causes a first data frame to be 516 samples, while the following data frame is returned to a normal 512 samples. This provides a realignment shift of 4 samples. The amount of normalized phase shift for the exemplary system described for a realignment shift of M samples is $\Delta\phi=\pm\text{bin}*M/512$ where "bin" refers to the bin location of the pilot tone.

As will be appreciated by one of skill in the art, an input buffer with a programmable output tap can be used alone, or a simple re-alignment of the out buffer can be done alone to result in a change in the sampling phase. But just using an input buffer increases the size needed for the input buffer, while simply realigning the output buffer decreases the phase resolution by the over-sampling ratio.

Figure 6:
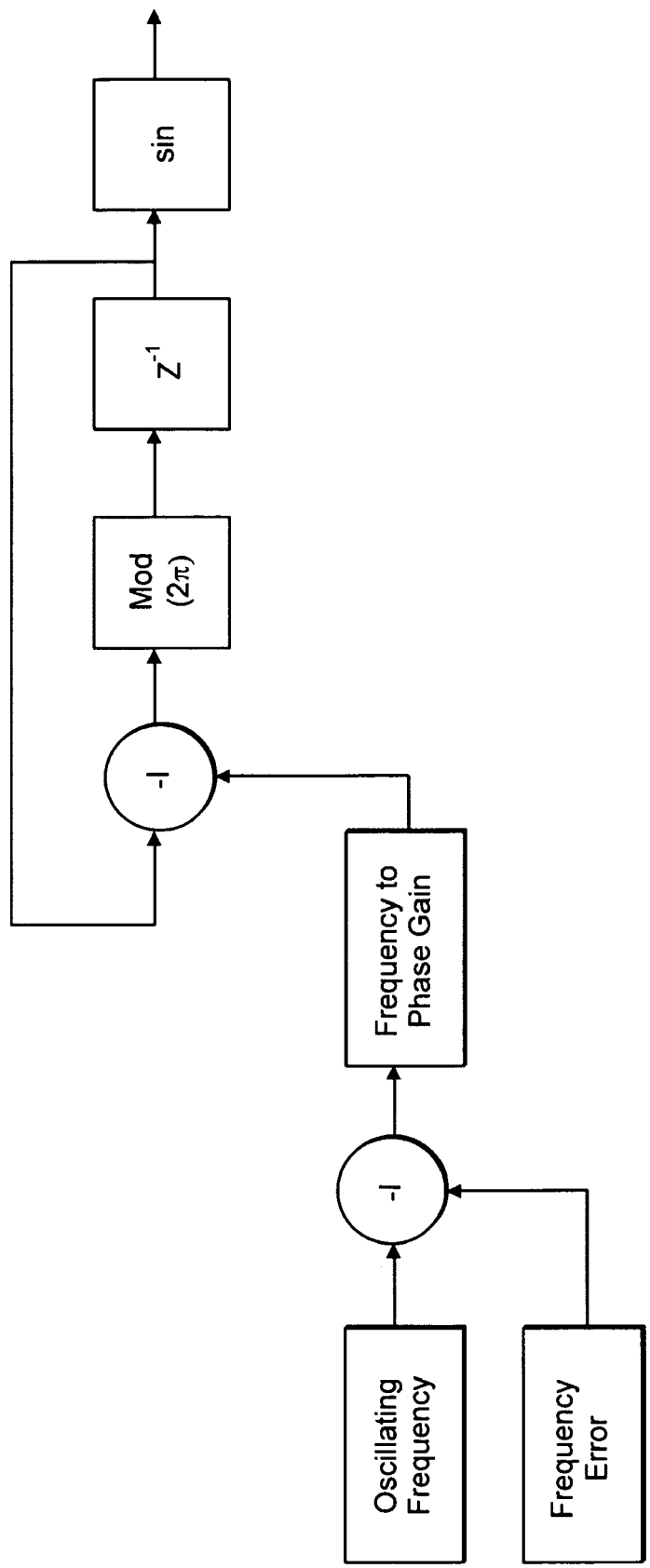
FIG. 6 illustrates a numerically controlled oscillator.

While any form of controllable oscillator can be used for VCO 220 in the present invention, a numerically controlled oscillator ("NCO"), as conceptually shown in FIG. 6, is preferably used. As is known, an NCO generates a staircase approximation to a sine (or cosine) wave. The frequency of the output sine wave is determined by an input phase increment value.

The nominal oscillating frequency of the NCO refers to the free-running frequency of the oscillator. The nominal oscillating frequency, however, needs to be modified by the frequency error to provide for the correct oscillating frequency, as indicated by the output of loop filter 500. Thus, the correct oscillating frequency as indicated by loop filter 500 is the nominal frequency plus the frequency error. Conceptually, this correct oscillating frequency is converted by a frequency-to-phase gain to a phase increment value, which is loaded into the NCO's phase accumulator. The frequency-to-phase gain is given by $$g=2\pi/F_o$$

where $F_o$ is the frequency of the NCO's phase accumulator (the NCO operating frequency). Loading the phase increment value into the phase accumulator results in the NCO generating the discrete sinusoidal samples at the correct oscillating frequency. These samples are input to a digital to analog converter (DAC), followed by an analog filter. The analog filter acts as an interpolator, an image rejection filter and suppresses higher-order harmonics present in the signal. The zero-crossing detector then generates the reference signal to create the clock from the filtered signal.

Figure 7:
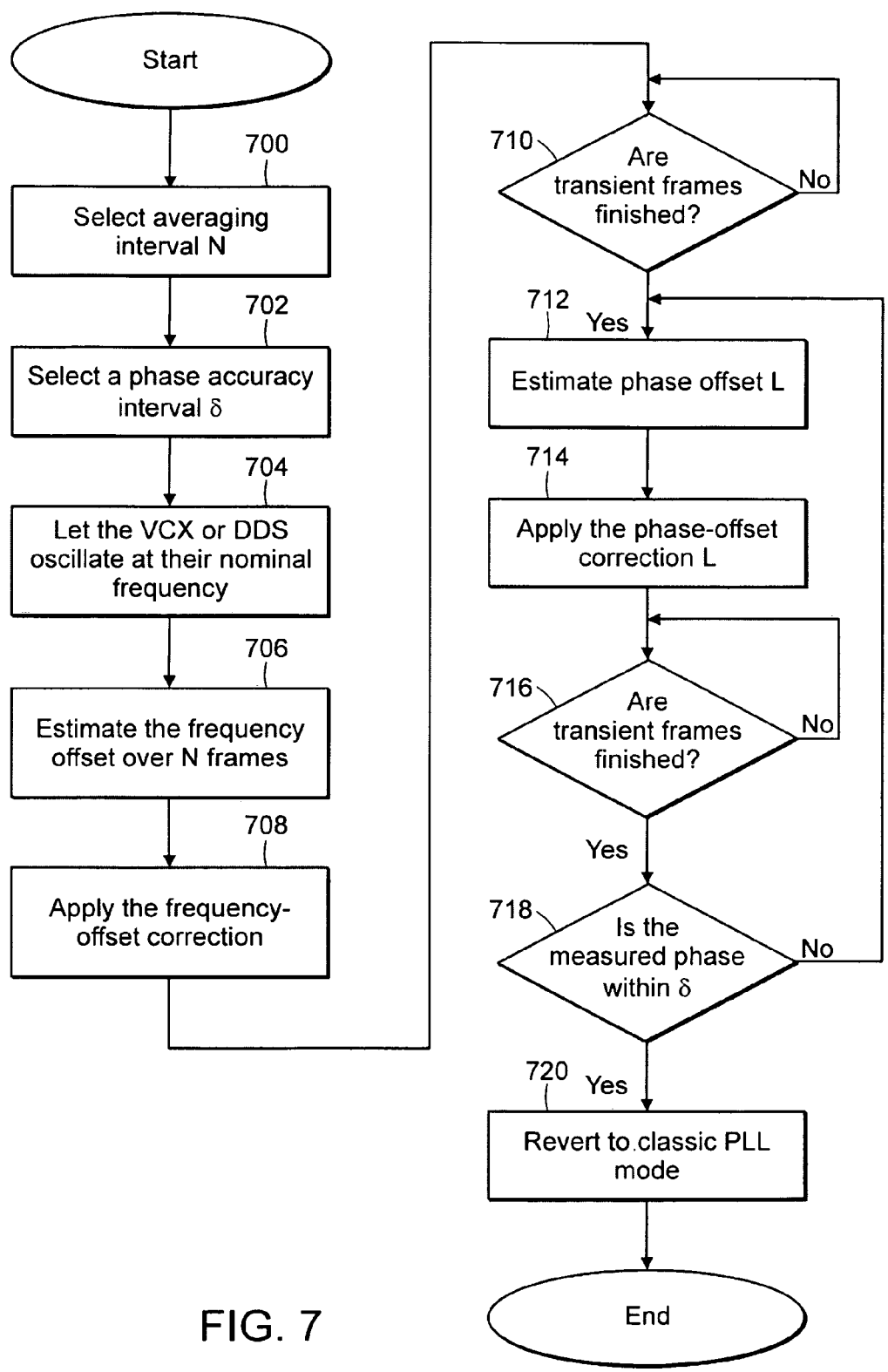
FIG. 7 illustrates the method of initial timing acquisition according to the present invention.

FIG. 7 generally outlines the method of the present invention for acquiring initial timing. First, an averaging interval N and a phase accuracy interval δ are chosen (steps 700 and 702). Next, the controllable oscillator (e.g., VCO, NCO) is relaxed to oscillate at its nominal frequency if it is not already doing so (step 704). As further described below, the frequency offset is then estimated over N frames (step 706). This frequency offset is then applied to the controllable oscillator by loading preload register 404 so as to bring the controllable oscillator into frequency synch (708). After the transient frames resulting from the frequency adjustment have settled (step 710), the phase offset is estimated, as described below (step 712). The phase offset is then corrected by shifting the samples of the received signal in the time domain using post filter 500 (step 714). After the transient frames have settled (step 716), a determination is made as to whether the phase offset is within the phase accuracy interval δ (step 718). If so, the DPLL reverts to operation as a conventional DPLL (step 720).

Frequency Offset Estimation

If x(t) represents the transmitted pilot tone with amplitude A, frequency $f_c$, and an initial phase $\Phi$, then in complex representation x(t) is given by:

$$x(t) = A e^{j\omega_c t + \phi}$$

At the receiver, x(t) is sampled at the rate of $f_s$, where $\omega_s = N\omega_c + \Omega$. The value $\Omega$ represents the frequency offset in radians/sec between the transmitter and receiver clocks. This frequency offset between the clocks in the receiver and the transmitter, in addition to additive noise $n_k$, is the primary factor affecting the value of $x_k$. The affect of the frequency offset is to instill a timing offset in the sampling time of the received signal. With a frequency offset, the FFT output for the phase of the pilot, $\phi_p$, corresponds to the pilot tone's initial phase value, $\Phi_p$, plus a timing phase offset, $\Delta\theta$, resulting from the corresponding timing offset. That is:

$$\phi_p = \Phi_p + \Delta\theta + \theta_o + n_k$$

where $\theta_o$ is an arbitrary starting phase.

The normalized timing phase offset, $\Delta\theta$, is given by $$\Delta\theta = 2\pi M(\Delta T/T)$$

where $\Delta T/T$ represents the normalized timing offset and is proportional to the frequency offset, and M is the number of cycles of transmitted signal in a symbol interval/FFT cycle. For most ADSL systems, by definition, the value M equals n, which is the bin number reserved for the pilot tone transmission. As an example, when there is a 200 PPM offset between the transmitter and receiver, and M=64 then $\theta$=0.08 rad.

As a result of the timing offset, the transmitted constellation point at the receiver will be changing at a rate of $\Delta\theta$ per symbol. As a result, the phase measured by taking the FFT will change by $\Delta\theta$ for each successive FFT cycle. Therefore, by taking the difference between successively measured phases, the timing phase offset is determined. From the timing phase offset, the amount of frequency offset between the transmitter and the receiver is ascertained. The amount of frequency offset $\Delta f$ can be ascertained because:

$$\Delta f = (\Delta T/T) f_p$$

where $f_p$ is the frequency of the pilot tone.

It is preferable, however, to filter the measured timing phase offset because of the additive noise $n_k$. The preferred filter is an averaging filter that averages the measured instantaneous timing phase offsets over N successive samples to determine an averaged timing phase offset. That is $$\overline{\Delta\theta} = \frac{\sum_N \Delta\theta_k}{N}$$

and $$\Delta\theta_k = \phi_k - \phi_{k-1}$$

where $\Delta\theta$ and $\overline{\Delta\theta}$ represent the instantaneous and average incremental phase, respectively, as a result of frequency offset between the transmitter and receiver. The averaged timing phase offset, $\overline{\Delta\theta}$, is then used to determine the frequency offset.

As mentioned above, upon measuring the frequency offset, $\Delta f$ the preload register 404 is loaded with a control voltage value needed to produce an output of loop filter 400 that causes the controllable oscillator to output the correct oscillating frequency. While measuring the frequency offset, the input to the LF should be set such that it avoids a locally induced change in the oscillators frequency, e.g. held constant.

Phase Offset Estimation and Correction

Upon estimating and correcting the frequency offset for the incoming signal, both transmitter and receiver are in frequency lock. But due to the initial frequency offset, and an arbitrary establishment of the frame timing at the receiver, the locally generated signals will not be in phase lock with the received signal. Since, there is frequency lock, however, phase offset between the transmitter and receiver will be a fixed amount, $\Phi$. It should be noted that the values of $\Phi$ value may change slightly, however, due to error in estimating frequency offset.

In a typical ADSL system, the pilot tone has a phase reference of $\pi/4$ radians. As such, by taking the last output of the FFT as the last measure of the received phase, $\phi$, then $\Phi$ is given by $$\Phi = \phi - \pi/4,$$

which will be output by TED 216. This phase offset is then corrected by shifting the samples of the received signal in the time domain by N samples using post filter 500 as described above to effectuate the needed phase change.

Although the present invention has been shown and described with respect to several preferred embodiments thereof, various changes, omissions and additions to the form and detail thereof, may be made therein, without departing from the spirit and scope of the invention. Further, it should be noted that while the present invention is described with respect to, and is particularly advantageous for, ADSL receivers, the present invention is not limited thereto.

What is claimed is:

1. A receiver comprising:
   a variable controlled oscillator;
   an analog-to-digital converter to receive an analog pilot signal and convert the pilot signal to a digital signal, wherein a clock for said analog-to-digital converter is produced from an output of said variable controlled oscillator;
   a post filter to receive said digital signal and apply a Fourier transform to successive data frames of said digital signal to produce successive phase outputs, said post filter using the successive phase outputs to determine a frequency offset between the frequency of the variable controlled oscillator and a frequency of an oscillator at a transmitter, said post filter shifting the digital signal in time before applying the Fourier transform so as to produce a shift in the phase outputs; and
   a loop filter to produce an output that controls the frequency of said variable controlled oscillator output, wherein said loop filter has a preload register such that said loop filter output depends on a value loaded into said preload register when the input to said loop filter is held at zero, said value loaded into the preload register being based on the determined frequency offset;
   said loop filter, based upon said value loaded into the preload register, changing a frequency of the output of said variable controlled oscillator to substantially eliminate the frequency offset;

said post filter, subsequent to and independent of the elimination of the frequency offset, determining a phase offset from a phase output and a known phase and shifting the digital signal in time before applying the Fourier transform so as to produce a shift in the phase outputs, thereby substantially eliminating the phase offset subsequent to and independent of the elimination of the frequency offset.

2. The receiver as per claim 1, wherein the post filter decimates and buffers the digital signal to form the data frames, and the shift of the digital signal in time is accomplished by changing the timing at which the digital signal is decimated and is buffered.

3. The receiver as per claim 1, wherein the frequency offset is determined from an instantaneous timing phase offset calculated by taking the difference between two successive phase outputs.

4. The receiver as per claim 1, wherein the frequency offset is determined from a filtered timing phase offset calculated by filtering multiple instantaneous timing phase offsets, wherein each instantaneous timing phase offset is calculated by taking the difference between two successive phase outputs.

5. The receiver as per claim 4, wherein the multiple instantaneous timing phase offsets are filtered with an averaging filter.

6. A method of eliminating frequency and phase offset between a variable controlled oscillator at a receiver and an oscillator at a transmitter using a received analog pilot tone having a known phase and transmitted by the transmitter, the method comprising:

converting the analog pilot signal to a digital signal;

holding the input of a loop filter constant, wherein the output of the loop filter controls the frequency of an output of the variable controlled oscillator;

determining the frequency offset from successive phase outputs that are produced by applying a Fourier transform to successive data frames of the digital signal;

loading a value into a preload register of the loop filter such that the loop filter produces an output that changes the frequency of the variable controlled oscillator to a value that substantially eliminates the frequency offset;

determining, subsequent to and independent of the frequency offset is substantially eliminated, the phase offset from a known phase and a phase output produced by applying a Fourier transform to a data frame of the digital signal; and shifting the digital signal in time, subsequent to and independent of the frequency offset is substantially eliminated, so as to shift subsequent phase outputs such that the phase offset is substantially eliminated.

7. The method as per claim 6, wherein the digital signal is decimated and buffered to form the data frames, and the shift of the digital signal in time is accomplished by changing the timing at which the digital signal is decimated and is buffered.

8. The method as per claim 6, wherein the frequency offset is determined from an instantaneous timing phase offset calculated by taking the difference between two successive phase outputs.

9. The method as per claim 6, wherein the frequency offset is determined from a filtered timing phase offset calculated by filtering multiple instantaneous timing phase offsets, wherein each instantaneous timing phase offset is calculated by taking the difference between two successive phase outputs.

10. The method as per claim 9, wherein the multiple instantaneous timing phase offsets are filtered with an averaging filter.

\* \* \* \* \*